United States Patent
Zhang

(10) Patent No.: US 10,924,168 B2
(45) Date of Patent: Feb. 16, 2021

(54) REFERENCE SIGNAL SENDING AND RECEIVING METHODS AND RELATED DEVICE

(71) Applicant: Huawei Technologies Co., Ltd., Shenzhen (CN)

(72) Inventor: Ruiqi Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/523,073

(22) Filed: Jul. 26, 2019

(65) Prior Publication Data

US 2019/0349041 A1    Nov. 14, 2019

Related U.S. Application Data

(63) Continuation of application No. PCT/CN2018/075468, filed on Feb. 6, 2018.

(30) Foreign Application Priority Data

Feb. 10, 2017    (CN) .......................... 201710074001.4

(51) Int. Cl.
   *H04L 5/12*      (2006.01)
   *H04B 7/0456*    (2017.01)
   *H04B 7/06*      (2006.01)
   *H04L 5/00*      (2006.01)

(52) U.S. Cl.
   CPC ........... *H04B 7/0456* (2013.01); *H04B 7/063* (2013.01); *H04B 7/0639* (2013.01); *H04L 5/0048* (2013.01)

(58) Field of Classification Search
   CPC ..... H04B 7/0456; H04B 7/063; H04B 7/0639; H04L 5/0048
   USPC ................ 375/262, 261, 259, 316, 219, 295
   See application file for complete search history.

(56) References Cited

U.S. PATENT DOCUMENTS

| | | | | |
|---|---|---|---|---|
| 2013/0258976 | A1* | 10/2013 | Nagata | .............. H04L 5/0091 370/329 |
| 2015/0319701 | A1  | 11/2015 | Ng et al. | |
| 2015/0319718 | A1* | 11/2015 | Yang   | ............. H04W 72/0406 370/252 |
| 2017/0279502 | A1  | 9/2017  | Kim et al. | |
| 2018/0034608 | A1  | 2/2018  | Seo et al. | |

FOREIGN PATENT DOCUMENTS

| | | |
|---|---|---|
| CN | 102577164 A  | 7/2012 |
| EP | 2899899 A1   | 7/2015 |
| WO | 2014023361 A1 | 2/2014 |
| WO | 2016043549 A1 | 3/2016 |
| WO | 2016126119 A1 | 8/2016 |

\* cited by examiner

*Primary Examiner* — Zewdu A Kassa
(74) *Attorney, Agent, or Firm* — Slater Matsil, LLP

(57) ABSTRACT

A reference signal sending method includes the following. A network device sends reference signals of N antenna ports and downlink data to a terminal device, where the reference signals of the N antenna ports include cell common reference signals of $N_1$ antenna ports and reference signals that are of $N_2$ antenna ports and that are specific to the terminal device. After receiving the reference signals of the N antenna ports and the downlink data, the terminal device detects the downlink data based on the reference signals.

20 Claims, 11 Drawing Sheets

REFERENCE SIGNAL SENDING AND RECEIVING METHODS AND RELATED DEVICE

CROSS-REFERENCE TO RELATED APPLICATIONS

This application is a continuation of International Application No. PCT/CN2018/075468, filed on Feb. 6, 2018, which claims priority to Chinese Patent Application No. 201710074001.4, filed on Feb. 10, 2017. The disclosures of the aforementioned applications are hereby incorporated by reference in their entireties.

TECHNICAL FIELD

The present invention relates to the field of mobile communications technologies, and in particular, to reference signal sending and receiving methods and a related device.

BACKGROUND

A multiple-input multiple-output (MIMO) technology is widely used in an LTE (Long Term Evolution) system. For a cell-edge user, a cell-edge signal-to-noise ratio is increased in a space frequency block coding (SFBC) transmission mode. For a cell-center user, a relatively high data transmission rate is provided in a multi-layer parallel transmission mode. If a base station end may obtain all or some downlink channel information, signal transmission quality or a signal transmission rate may be improved by using a precoding technology.

In LTE, one downlink subframe includes two slots, and each slot includes seven orthogonal frequency division multiplexing (OFDM) symbols. That is, one downlink subframe includes 14 orthogonal frequency division multiplexing (OFDM) symbols in total. When terminal devices are scheduled in one downlink subframe, a minimum unit of a physical resource allocated to each terminal device is a physical resource block pair (PRB pair). One PRB pair includes 12 subcarriers in frequency domain, and is half subframe long in time domain, that is, includes seven symbols. One subcarrier on one symbol is one resource element. In FIG. 1a to FIG. 1c, 1 represents indexes 0 to 6 of symbols in one slot.

A common reference signal (CRS) is defined in LTE Release 8 (LTE Rel-8 for short).

In a subframe, both a time-frequency location of a common pilot reference signal and a quantity of ports for the common pilot reference signal are fixed. The time-frequency location and the quantity of ports are visible to all users in a cell, and the ports are unrelated to a quantity of users in the cell and a transmission manner used by each user. For example, FIG. 1a to FIG. 1c respectively show a pilot pattern of the common reference signal when a quantity of ports for a common reference signal is one, two, or four. In FIG. 1a to FIG. 1c, locations of CRSs on one PRB pair are marked. $R_0$ represents an antenna port 0, $R_1$ represents an antenna port 1, $R_2$ represents an antenna port 2, and $R_3$ represents an antenna port 3.

A demodulation pilot reference signal (DMRS) is defined in LTE Release 9 and Release 10 (LTE Rel 9/10), a quantity of ports for and a pattern of the demodulation pilot reference signal are related to a quantity of layers of data allocated to a terminal, and the demodulation pilot reference signal exists only on a bandwidth allocated to the terminal. The demodulation pilot reference signal may support a maximum of eight ports. A demodulation pilot reference signal supporting four ports is used as an example, and a pilot pattern of each port is shown in FIG. 2. In FIG. 2, $R_7$ represents an antenna port 7, $R_8$ represents an antenna port 8, $R_9$ represents an antenna port 9, and $R_{10}$ represents an antenna port 10.

Ten downlink transmission modes (TM) are defined in LTE, and are a TM 1 to a TM 10. Data is demodulated by using a CRS in the TM 1 to the TM 6. The TM 7 to the TM 10 define demodulation reference signal (DMRS) based transmission modes, and demodulation on a downlink data channel is performed by using a DMRS. A quantity of layers of downlink data is also a rank. In the TM 7 to the TM 10, the quantity of layers of the downlink data needs to keep consistent with a quantity of antenna ports for the DMRS because data is demodulated by using a DMRS. A reference signal further includes a CRS. Consequently, the reference signal occupies a relative large quantity of time-frequency resources, thereby reducing utilization of system resources.

SUMMARY

This application describes reference signal sending and receiving methods and a related device. In this application, a network device sends cell common reference signals of $N_1$ antenna ports, reference signals that are of $N_2$ antenna ports and that are specific to the user equipment, and downlink data to a terminal device. The terminal device demodulates the downlink data by using the reference signals of the $N_1+N_2$ antenna ports. Based on the method, reference signal overheads are reduced in a system, so as to increase a data rate.

According to a first aspect, an embodiment of this application provides a reference signal sending method, where the method includes generating, by a network device, reference signals that are of N antenna ports and that are used to demodulate downlink data. The method also includes sending, by the network device, the reference signals of the N antenna ports and the downlink data to a terminal device, where the reference signals of the N antenna ports include cell common reference signals of $N_1$ antenna ports and reference signals that are of $N_2$ antenna ports and that are specific to the terminal device, N is an integer greater than or equal to 2, $N=N_1+N_2$, and $N_1$ and $N_2$ are positive integers.

Based on the method, the network device may configure the reference signals that are of the corresponding $N_2$ antenna ports and that are specific to the terminal device for each terminal device based on characteristics of each terminal device, such as a channel condition and a quantity of antenna ports that the terminal device is equipped with, so that resources occupied by the reference signals match each terminal device. In addition, the cell common reference signals of the $N_1$ antenna ports are used, so that reference signal overheads can be reduced, and resource utilization is increased.

Optionally, a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

Based on the method, the cell common reference signals of the $N_1$ antenna ports are shared by all terminal devices in a cell, and can enable the network device to be compatible with an existing terminal device. The reference signals that are of the $N_2$ antenna ports and that are specific to the terminal device exist only on a bandwidth allocated to the terminal device, so that the reference signals that are of the $N_2$ antenna ports and that are specific to the terminal device do not affect data sending performed by a terminal device on another bandwidth.

Optionally, before the network device sends the downlink data to the terminal device, the method further includes sending, by the network device, a first message to the terminal device, where the first message is used to indicate resources of the reference signals of the $N_2$ antenna ports in frequency domain.

Based on the method, the network device may flexibly designate, for the terminal device based on frequency domain locations allocated to the terminal device, frequency domain locations of the reference signals that are of the $N_2$ antenna ports and that are specific to the terminal device. Therefore, the reference signals of the $N_2$ antenna ports exist only on a bandwidth designated by the network device, thereby improving control flexibility of the network device.

Optionally, the network device sends a second message to the terminal device, where the second message is used to indicate a value of $N_2$.

Based on the method, the network device may flexibly control, based on characteristics of the terminal device, such as a channel condition and a quantity of antenna ports that the terminal device is equipped with, resources occupied by the reference signals specific to the terminal device, thereby increasing resource utilization.

Optionally, the network device sends a precoding matrix indication PMI to the terminal device, where the PMI is used to indicate a precoding matrix.

Based on the method, the network device may ensure that the reference signals of the $N_1$ antenna ports are shared by all terminal devices in a cell, so that the terminal device may obtain a performance gain generated through precoding, thereby improving performance of the terminal device, and increasing network resource utilization.

Optionally, the sending, by the network device, the reference signals of the N antenna ports and the downlink data to a terminal device includes sending, by the network device, the reference signals of the N antenna ports and the downlink data in a same subframe.

According to a second aspect, an embodiment of this application provides a reference signal receiving method, where the method includes receiving, by a terminal device, reference signals of N antenna ports and downlink data from a network device. The method also includes demodulating, by the terminal device, the downlink data based on the reference signals of the N antenna ports, where the reference signals of the N antenna ports include cell common reference signals of $N_1$ antenna ports and reference signals that are of $N_2$ antenna ports and that are specific to the terminal device, N is an integer greater than or equal to 2, $N=N_1+N_2$, and $N_1$ and $N_2$ are positive integers.

Optionally, a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

Optionally, the terminal device receives a first message from the network device, and the terminal device determines resources of the reference signals of the $N_2$ antenna ports in frequency domain based on the first message.

Optionally, the terminal device receives a second message from the network device, and the terminal device determines a value of $N_2$ based on the second message.

Optionally, the terminal device receives a precoding matrix indication PMI from the network device, and the terminal device determines a precoding matrix based on the PMI. Also, the demodulating, by the terminal device, the downlink data based on the reference signals of the N antenna ports includes demodulating, by the terminal device, the downlink data based on the reference signals of the N antenna ports and the precoding matrix indication.

Optionally, the receiving, by a terminal device, reference signals of N antenna ports and downlink data from a network device includes receiving, by the terminal device, the reference signals of the N antenna ports and the downlink data in a same subframe.

Based on the method, the terminal device may demodulate the data by using both the cell common reference signals of the $N_1$ antenna ports and the reference signals that are of the $N_2$ antenna ports and that are specific to the terminal device, so that reference signal overheads can be reduced, and resource utilization is increased.

According to a third aspect, an embodiment of this application provides a network device, where the network device has a function of implementing behavior of the network device in the foregoing method designs. The function may be implemented by using hardware, or may be implemented by using hardware executing corresponding software. The hardware or software includes one or more modules corresponding to the foregoing function.

The network device includes a processing unit, configured to generate reference signals that are of N antenna ports and that are used to demodulate downlink data. The network device also includes a sending unit, configured to send the reference signals of the N antenna ports and the downlink data to a terminal device, where the reference signals of the N antenna ports include cell common reference signals of $N_1$ antenna ports and reference signals that are of $N_2$ antenna ports and that are specific to the terminal device, N is an integer greater than or equal to 2, $N=N_1+N_2$, and $N_1$ and $N_2$ are positive integers.

Optionally, a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

Optionally, before sending the downlink data to the terminal device, the sending unit is further configured to send a first message to the terminal device, where the first message is used to indicate resources of the reference signals of the $N_2$ antenna ports in frequency domain.

Optionally, the sending unit is further configured to send a second message to the terminal device, where the second message is used to indicate a value of $N_2$.

Optionally, the sending unit is further configured to send a precoding matrix indication PMI to the terminal device, where the PMI is used to indicate a precoding matrix.

Optionally, that the sending unit is configured to send the reference signals of the N antenna ports and the downlink data to a terminal device includes the sending unit sends the reference signals of the N antenna ports and the downlink data in a same subframe.

According to a fourth aspect, an embodiment of this application provides another terminal device, where the terminal device has a function of implementing behavior of the terminal device in the foregoing method designs. The function may be implemented by using hardware, or may be implemented by using hardware executing corresponding software. The hardware or software includes one or more modules corresponding to the foregoing function. The modules may be software and/or hardware.

The terminal device includes a receiving unit, configured to receive reference signals of N antenna ports and downlink data from a network device. The terminal device also includes a processing unit, configured to demodulate the downlink data based on the reference signals of the N antenna ports, where the reference signals of the N antenna ports include cell common reference signals of $N_1$ antenna ports and reference signals that are of $N_2$ antenna ports and that are specific to the terminal device, N is an integer greater than or equal to 2, $N=N_1+N_2$, and $N_1$ and $N_2$ are positive integers.

Optionally, a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

Optionally, the receiving unit is further configured to receive a first message from the network device, and the processing unit is further configured to determine resources of the reference signals of the $N_2$ antenna ports in frequency domain based on the first message.

Optionally, the receiving unit is further configured to receive a second message from the network device, and the processing unit is further configured to determine a value of $N_2$ based on the second message.

Optionally, the receiving unit is further configured to receive a second message from the network device, and the processing unit is further configured to determine a value of $N_2$ based on the second message.

Optionally, that a receiving unit is configured to receive reference signals of N antenna ports and downlink data from a network device includes that the receiving unit is further configured to receive the reference signals of the N antenna ports and the downlink data in a same subframe.

According to a fifth aspect, an embodiment of this application provides a computer storage medium, configured to store a computer software instruction used by the network device. The computer storage medium includes a program designed to perform the first aspect.

According to a sixth aspect, an embodiment of this application provides a computer storage medium, configured to store a computer software instruction used by the terminal device. The computer storage medium includes a program designed to perform the second aspect.

According to a seventh aspect, an embodiment of this application provides a computer program product, where the computer program product includes an instruction, and when the computer program is executed by a computer, the instruction enables the computer to execute the functions executed by the network device in the foregoing method.

According to an eighth aspect, an embodiment of this application provides a computer program product, where the computer program product includes an instruction, and when the computer program is executed by a computer, the instruction enables the computer to execute the functions executed by the terminal device in the foregoing method.

An embodiment of the present invention further provides a system, where the system includes the terminal device and the network device in the foregoing embodiments.

Compared with the prior art, according to the methods and devices provided in the embodiments of this application, the terminal device uses the cell common reference signals sent by the network device and the reference signal specific to the terminal device as the demodulation reference signals of the terminal device. Based on the solutions of this application, reference signal overheads can be reduced, and resource utilization of the system can be increased.

DESCRIPTION OF EMBODIMENTS

Figure 3:
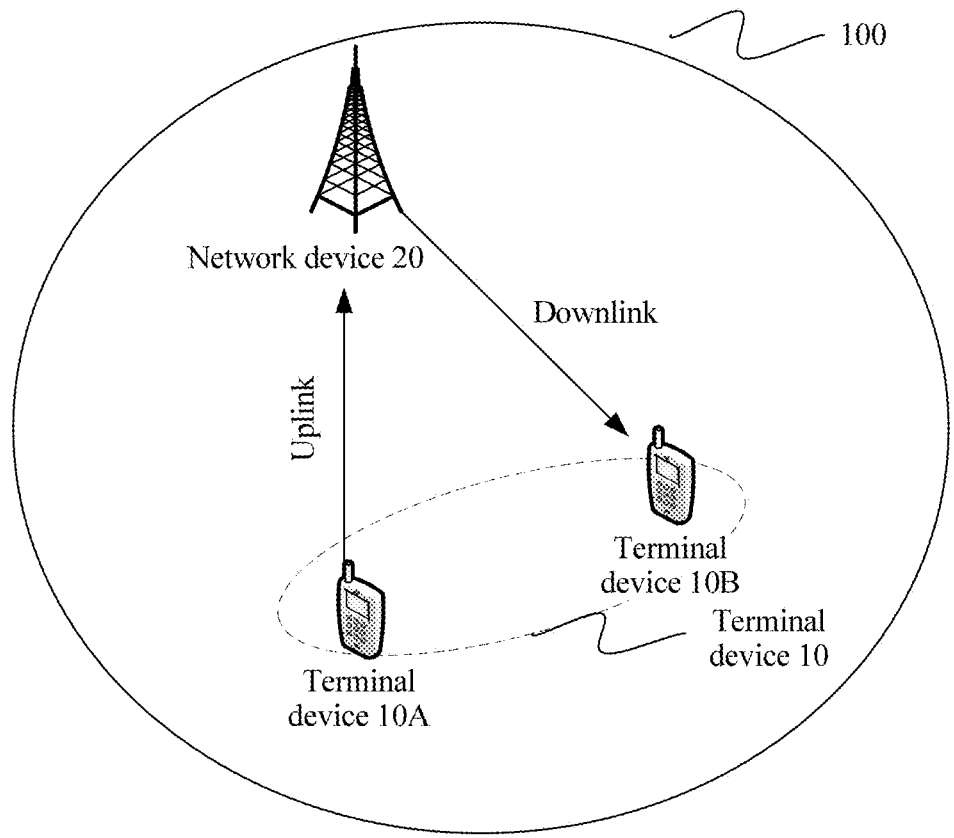
FIG. 3 is a schematic diagram of a communications system according to an embodiment of the present invention.

Embodiments of the present invention provide a solution based on a communications system shown in FIG. 3, to reduce reference signal overheads, and improve performance of the system. An embodiment of the present invention provides a communications system 100. The communications system 100 includes at least one base station and a plurality of terminal devices. The plurality of terminal devices communicate with the base station. On a downlink, the base station communicates with the terminal devices by using a downlink channel. Using FIG. 3 as an example, a base station 20 communicates with terminal devices 10, and the terminal devices 10 include terminal devices 10A and 10B. On an uplink, the terminal devices communicate with the base station by using an uplink channel. The downlink is a direction in which the base station sends data to the terminal devices, and the uplink is a direction in which the terminal devices send data to the base station. On the downlink, the base station sends a reference signal, and the terminal devices perform corresponding processing after receiving the reference signal. For example, a terminal device receives a CRS, and may demodulate data by using the CRS. Alternatively, the terminal device may determine channel state information based on a CRS, and then report the channel state information to the base station. If the terminal device receives a channel state information-reference signal (CSI-RS), the terminal device determines the CSI based on the CSI-RS, and then reports the CSI to the base station. In a long term evolution (LTE) standard, the channel state information (CSI) includes one or more of the following information: a channel quality indicator (CQI), a precoding matrix indication (or Precoding Matrix Indicator, PMI), a precoding type indicator (PTI), and a rank indicator (RI).

If the terminal device receives a DMRS, the terminal device demodulates data based on the DMRS. In a current LTE standard, a corresponding CRS and corresponding CSI are sent by the base station on an entire system bandwidth. However, the DMRS is sent by the base station on a bandwidth on which the terminal device receives the data.

It should be understood that technical solutions in the embodiments of the present invention may be applied to various communications systems, such as a long term evolution (LTE) system, an LTE frequency division duplex (FDD) system, an LTE time division duplex (TDD) communications system, a 5G (fifth generation) LTE system, and a 5G NR (new radio) system.

It should be further understood that, in the embodiments of the present invention, the terminal device (or terminal equipment) may be referred to as a terminal, and may be user equipment (UE), a mobile station (MS), a mobile terminal, a notebook computer, or the like. The terminal device may communicate with one or more core networks through a radio access network (RAN). For example, the terminal device may be a mobile phone (or referred to as a "cellular" phone) or a computer having a mobile terminal. For example, the terminal device may further be a portable, pocket-sized, handheld, computer built-in, or vehicle-mounted mobile apparatus, which exchanges voice and/or data with the radio access network.

In the embodiments of the present invention, a network device may be an evolved NodeB (evolved node B, "eNB or e-NodeB" for short) in the LTE system, a 5G LTE gNB, a 5G NR gNB, another base station, or a network device, for example, a relay. This is not limited in the present invention.

A cell common reference signal is a reference signal shared by all terminal devices in a cell. Generally, the network device frequently sends the cell common reference signal. For example, in the LTE system, a CRS is a cell common reference signal. The base station sends the CRS in each subframe. In addition, each terminal device in the cell is aware of existence of the CRS. Generally, the base station sends a reference signal specific to the terminal device when necessary. For example, in the LTE system, a DMRS is a reference signal specific to the terminal device. A base station in LTE sends the DMRS to the terminal device only when the base station sends downlink data to the terminal device. In downlink transmission modes TM 7 to TM 10, the terminal device demodulates data by using the DMRS. In addition, the CRS exists in each subframe. In the TM 7 to the TM 10, because the data is demodulated by using the DMRS, a quantity of layers of the downlink data needs to keep consistent with a quantity of antenna ports for the DMRS. In addition, the CRS further exists in the system. Consequently, a reference signal occupies a relative large quantity of time-frequency resources, thereby reducing utilization of system resources, and deteriorating system performance. For example, in a downlink TM 3 and TM 4, data transmission with a maximum rank of 4 of a channel is supported. To support data transmission with a downlink rank of 3 or 4, a quantity of ports for the common reference signal (CRS) needs to be configured as four. In an actual network, there are not many users who support the ranks of 3 and 4. Users that can transmit downlink data by using only a rank less than 3 in most cases do not apparently benefit from use of a CRS supporting four ports. In contrast, because excessive CRS ports occupy downlink time-frequency resources, resources used to transmit the downlink data are reduced, thereby deteriorating system performance.

A reference signal sending method provided in an embodiment of the present invention is described below in detail with reference to the accompanying drawings.

Figure 4A:
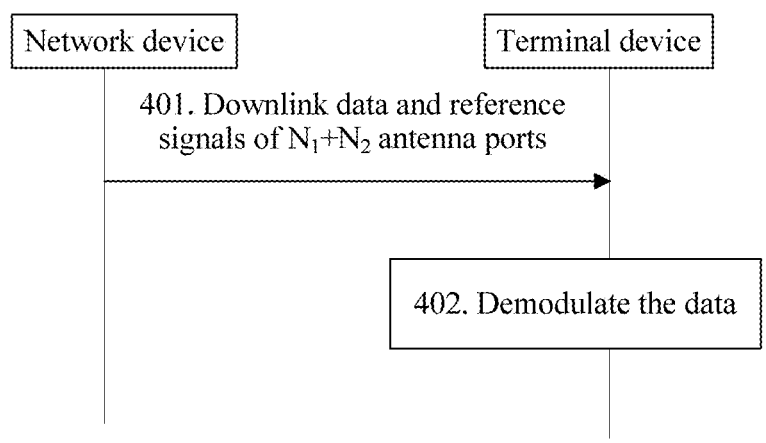
FIG. 4a is a schematic flowchart of a reference signal sending method according to an embodiment of the present invention.

FIG. 4a is a schematic flowchart of a reference signal sending method according to an embodiment of the present invention. A network device in FIG. 4a may be the base station 20 in FIG. 3, and a terminal device in FIG. 4a may be the terminal device 10 in FIG. 3, to be specific, the terminal device 10A or the terminal device 10B. As shown in FIG. 4a, the method includes the following steps.

Step 401: The network device sends downlink data and reference signals of N antenna ports to the terminal device.

In step 401, the network device generates the reference signals that are of the N antenna ports and that are used to demodulate the downlink data, and the network device sends the downlink data and the reference signals of the N antenna ports to the terminal device. The reference signals of the N antenna ports include cell common reference signals of $N_1$ antenna ports and reference signals that are of $N_2$ antenna ports and that are specific to the terminal device, N is an integer greater than or equal to 2, $N=N_1+N_2$, and $N_1$ and $N_2$ are positive integers. The network device may configure the reference signals that are of the corresponding $N_2$ antenna ports and that are specific to the terminal device for each terminal device based on characteristics of each terminal device, such as a channel condition and a quantity of antenna ports that the terminal device is equipped with, so that resources occupied by the reference signals match each terminal device. In addition, the cell common reference signals of the $N_1$ antenna ports are used, so that reference signal overheads can be reduced, and resource utilization is increased.

Figure 2:
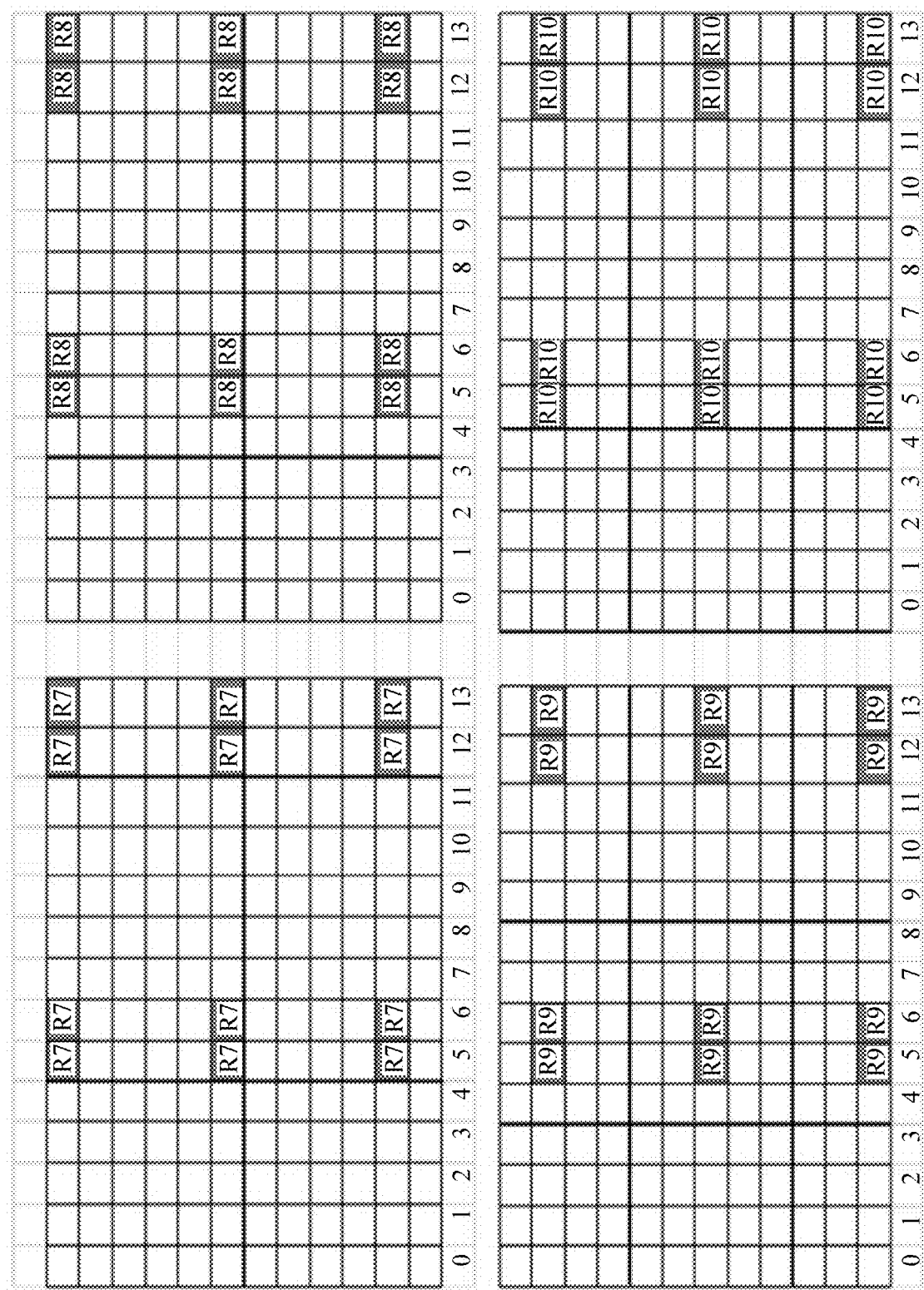
FIG. 2 is a schematic diagram of four DMRS antenna ports in LTE.

For example, the cell common reference signals of the $N_1$ antenna ports are CRSs. The $N_2$ antenna ports are the reference signals specific to the terminal device. Patterns of the reference signals specific to the terminal device may be shown in FIG. 2. A bandwidth in frequency domain for the cell common reference signals of the $N_1$ antenna ports is different from a bandwidth in frequency domain for the reference signals that are of the $N_2$ antenna ports and that are specific to the terminal device.

Optionally, a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth. For example, the reference signals of the $N_1$ antenna ports are CRSs. The network device needs to send all the CRSs on the entire system bandwidth. In addition, the reference signals of the $N_2$ antenna ports are specific to the terminal device, and have the bandwidth same as a bandwidth of the downlink data. It is assumed that the system bandwidth is 10 MHz, the CRSs are all sent by the network device on the 10 MHz. If the network device sends the downlink data to the terminal device on a 1 MHz bandwidth, the network device sends the reference signals of the $N_2$ antenna ports only on the 1 MHz bandwidth. The 1 MHz bandwidth is a portion of the 10 MHz system bandwidth. The cell common reference signals of the $N_1$ antenna ports are shared by all terminal devices in a cell. In this way, the network device may be compatible with a terminal device supporting an earlier LTE release, for example, a terminal device supporting LTE Release 8. The reference signals that are of the $N_2$ antenna ports and that are specific to the terminal device exist only on a bandwidth allocated to the terminal device, so that the reference signals that are of the $N_2$ antenna ports and that are specific to the terminal device do not affect data sending performed by a terminal device on another bandwidth.

Figure 1A:
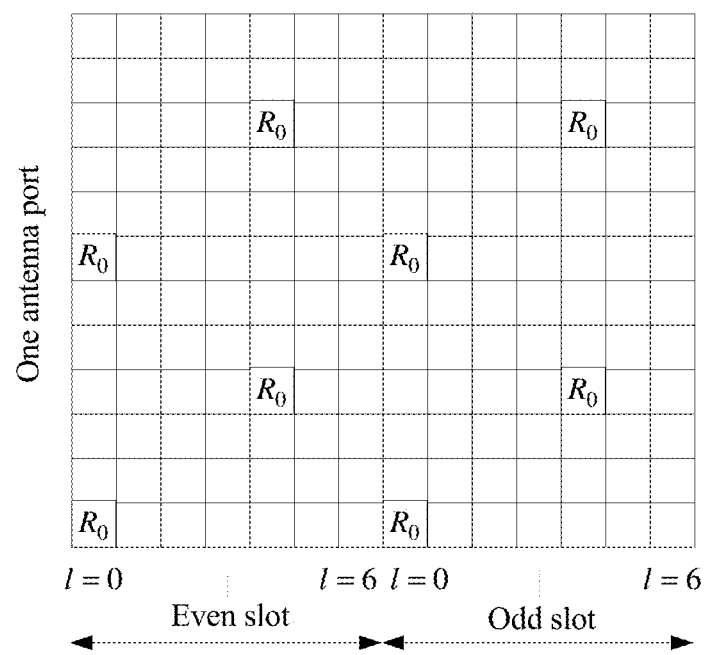
FIG. 1a is a schematic diagram of one CRS antenna port in LTE.
Figure 1B:
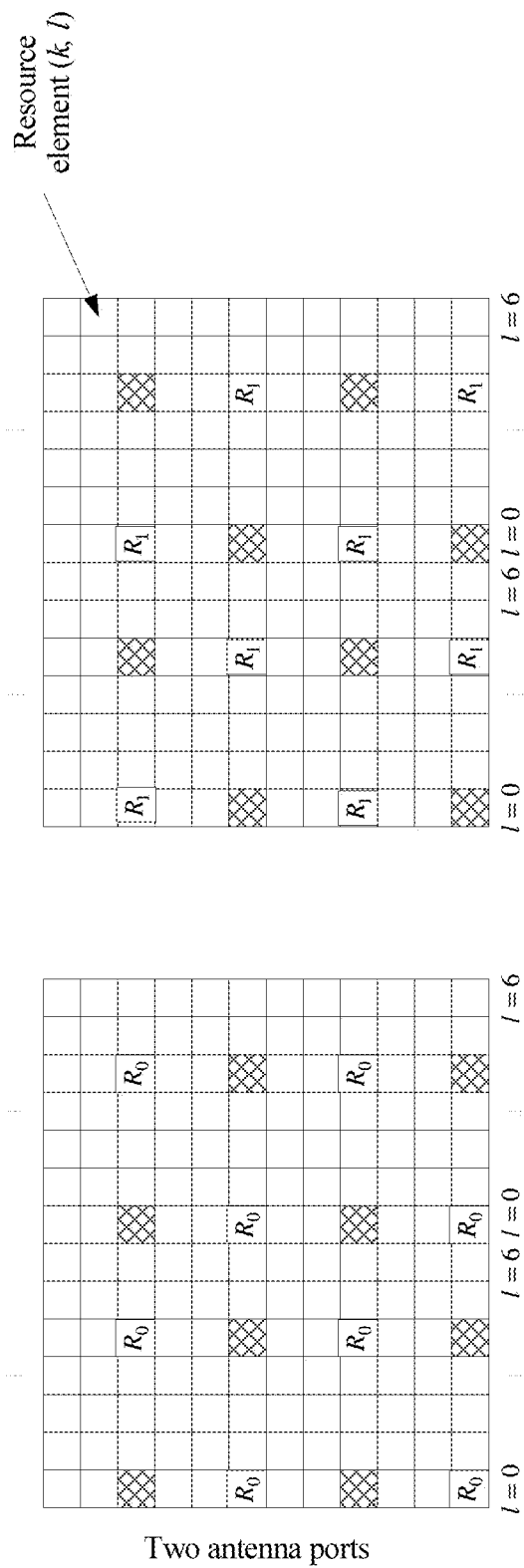
FIG. 1b is a schematic diagram of two CRS antenna ports in LTE.
Figure 1C:
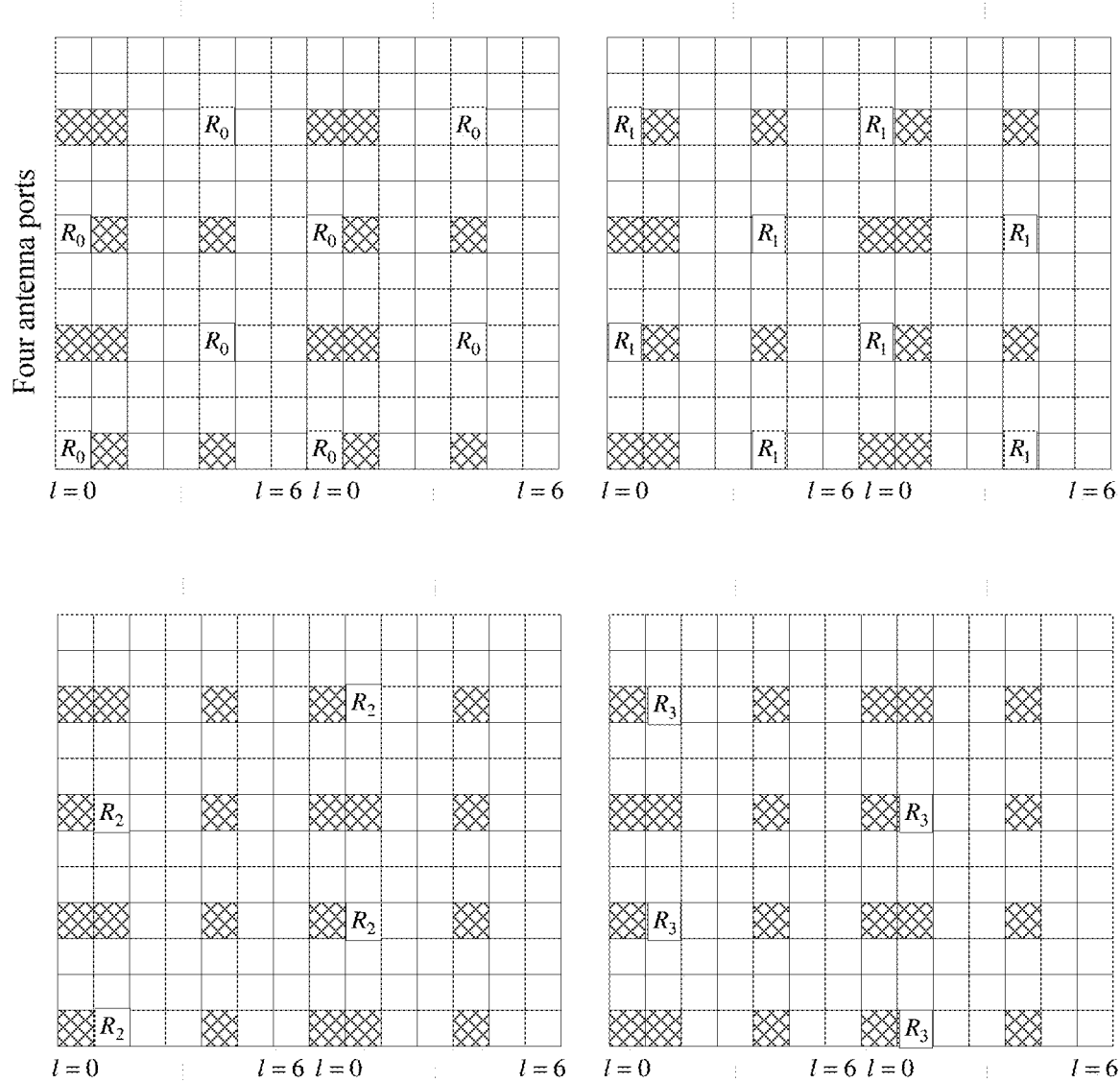
FIG. 1c is a schematic diagram of four CRS antenna ports in LTE.
Figure 5:
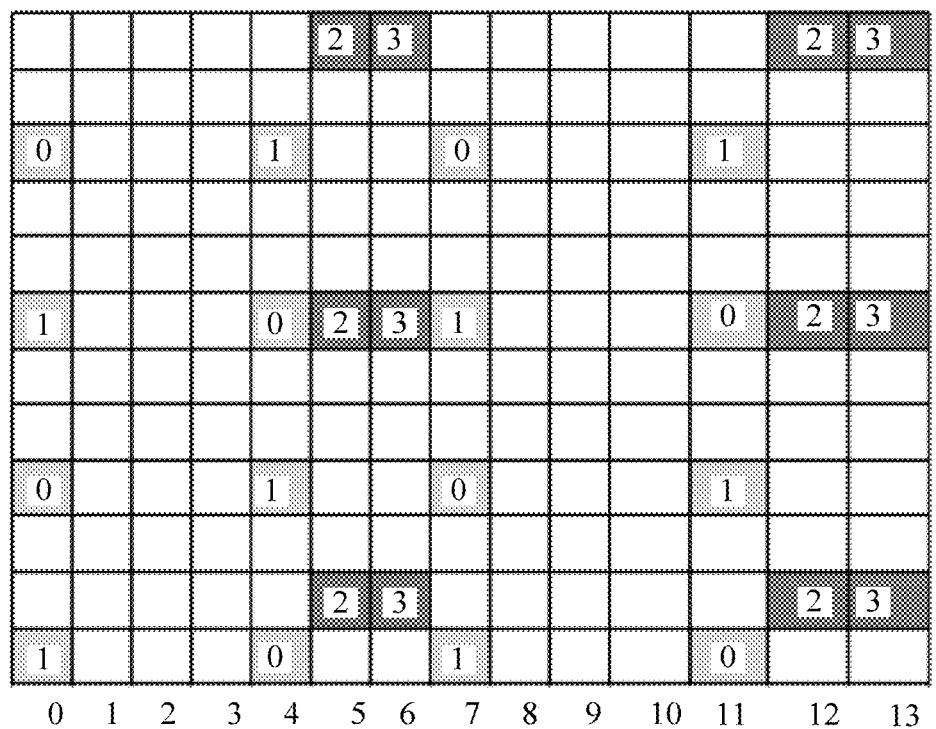
FIG. 5 is a schematic diagram of cell common reference signals of two antenna ports and reference signals that are of two antenna ports and that are specific to a terminal device according to an embodiment of the present invention.

An example in which the reference signals of the $N_1$ antenna ports are CRSs are used below for description. A value of $N_1$ is carried over a physical broadcast channel. In addition, $N_1$ is fixed in a cell. Assuming that $N_1=2$, the $N_1=2$ antenna ports occupy locations of resources of CRS ports 0 and 1. CRSs exist on the entire system bandwidth. FIG. 1b shows locations of resources of the CRS ports 0 and 1 in one physical resource block pair. The reference signals of the $N_2$ antenna ports are related to a quantity of transmission layers of the downlink data, and appear only when the quantity of layers of the downlink data is greater than 2. For example, $N_2=2$, and locations of CRS ports 2 and 3 are occupied in one physical resource block pair, and are respectively $R_2$ and $R_3$ in FIG. 1c. In addition, physical resource blocks occupied in frequency domain by the reference signals of the $N_2=2$ antenna ports are the same as those occupied by the downlink data. When $N_2=2$, resources occupied in one physical resource block pair by the reference signals of the two antenna ports may also be shown in FIG. 5. Portions marked as 2 and 3 in FIG. 5 are time-frequency resources of the reference signals of the two antenna ports. Numbers 0 to 13 in a lower part of FIG. 5 represents OFDM symbols with indexes of 0 to 13 in one physical resource block pair. Likewise, this case also exists in FIG. 6 and FIG. 7.

Figure 6:
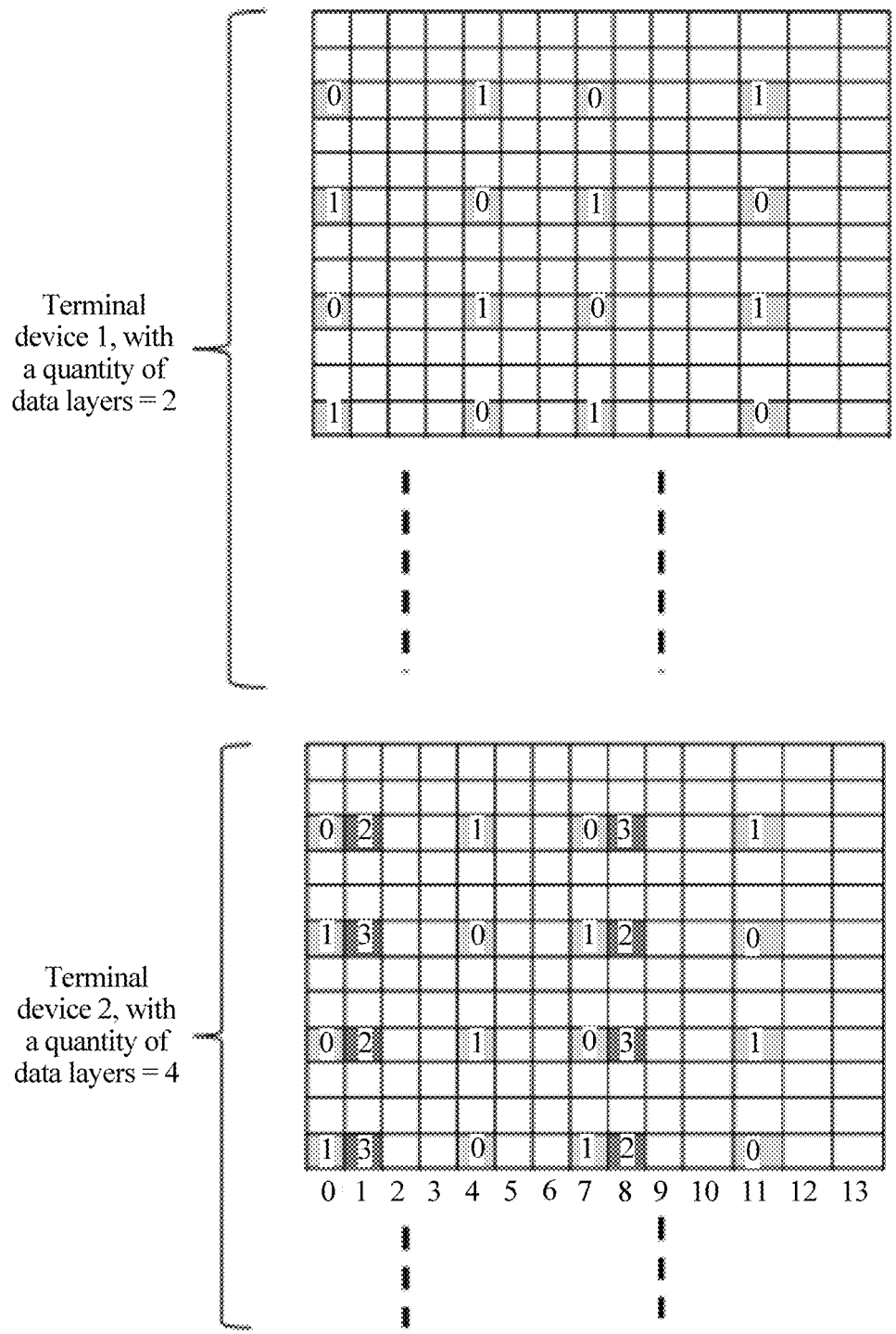
FIG. 6 is a schematic diagram of reference signals in scenarios in which a quantity of data layers is equal to two and a quantity of data layers is equal to four according to an embodiment of the present invention.

An LTE system is used as an example, and the network device schedules two terminal devices in one subframe. The network device allocates a bandwidth 1 to a terminal device 1 for transmission of a physical downlink data channel (physical downlink shared channel, PDSCH), and a quantity of layers of the PDSCH is two (a rank=2). The network device allocates a bandwidth 2 to a terminal device 2 for transmission of a downlink PDSCH, and a quantity of layers of the PDSCH is four. Pilot patterns of the entire subframe are shown in FIG. 6. In FIG. 6, locations marked as 0, 1, 2, and 3 are respectively time-frequency resource locations of reference signals of antenna ports 0, 1, 2, and 3. In FIG. 6, $N_1=2$, and the two antenna ports are respectively the antenna ports 0 and 1. The terminal device 1 demodulates data by using reference signals of only the antenna ports 0 and 1. The reference signals of the antenna ports 0 and 1 are sent by the network device on the entire system bandwidth, and are cell common reference signals. Because a quantity of layers of downlink data is four, the terminal device 2 needs to demodulate the downlink data by using reference signals of at least four antenna ports. All the reference signals of the antenna ports 0, 1, 2, and 3 in FIG. 6 are used to demodulate the downlink data. In addition, same as the terminal device 2, reference signals of the antenna ports 2 and 3 are sent only on the bandwidth 2.

Figure 7:
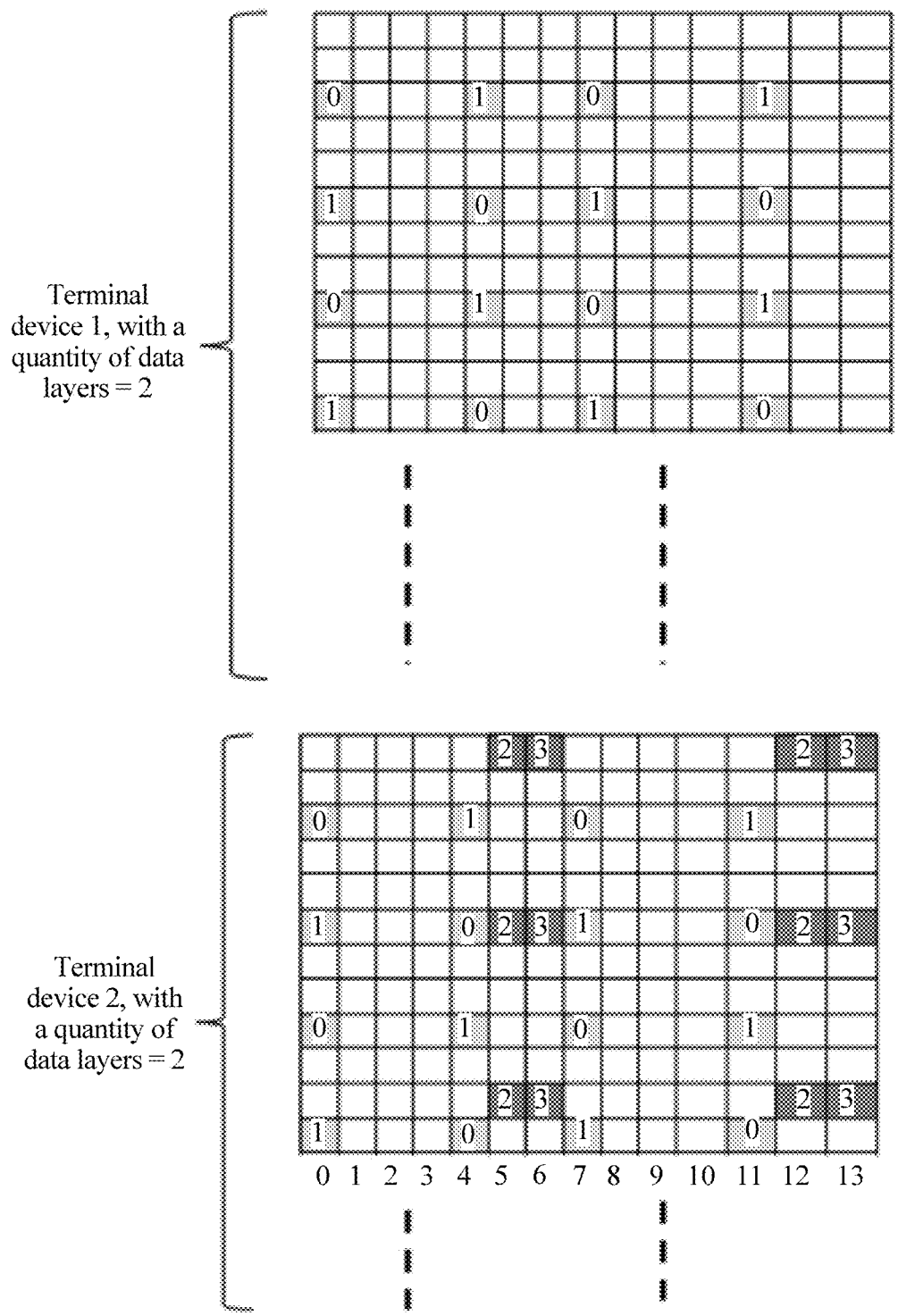
FIG. 7 is a schematic diagram of reference signals in scenarios in which a quantity of data layers is equal to two according to an embodiment of the present invention.

When the quantity of layers of the downlink data is equal to 4, reference signals that are of the $N_2$ antenna ports and that are specific to the terminal device 2 may alternatively not vary with a quantity of transmission layers of user data. For example, the specific reference signals of the $N_2$ antenna ports are semi-statically configured by a base station by using radio resource control (RRC) signaling. For example, if the terminal device 1 has only two receive antennas, the terminal device can support transmission of downlink data having a maximum of only two layers. In addition, if the terminal device 2 has four receive antennas, the terminal device may support transmission of downlink data having a maximum of four layers. The network device may configure the terminal device 1 to demodulate the data by using only $N_1=2$ cell common reference signals. In addition, the network device configures, for the terminal device 2, $N_1=2$ cell common reference signals and $N_2=2$ reference signals specific to the terminal device. Regardless of the quantity of layers of the downlink data sent by the network device, the terminal device 2 demodulates the downlink data based on a total quantity of antenna ports for the cell common reference signals and the reference signals specific to the terminal device. As shown in FIG. 7, even if the quantity of layers of the downlink data received by the terminal device 2 is equal to two, a total quantity of antenna ports for the reference signals used to demodulate the downlink data is also four.

Figure 4B:
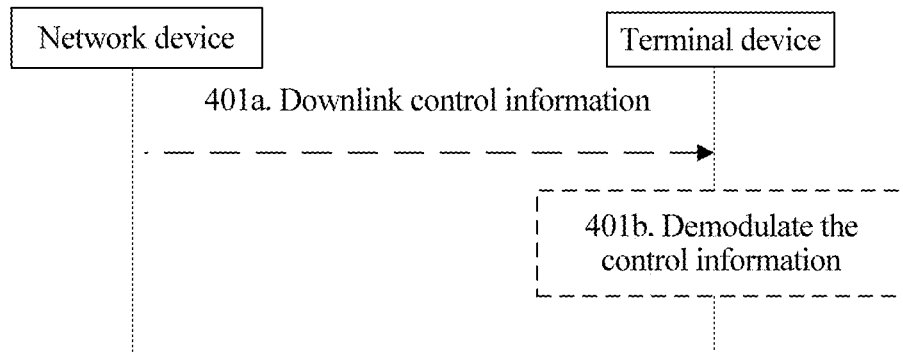
FIG. 4b is a schematic flowchart of sending downlink control signaling by a network device according to an embodiment of the present invention.

Optionally, before the network device sends the downlink data, the network device sends downlink control information to the terminal device, as shown in FIG. 4b. In step 401a in FIG. 4b, the network device sends the downlink control information to the terminal device. The downlink control information includes scheduling information of the downlink data. The scheduling information may include a frequency domain resource, a modulation scheme, and the like of the downlink data. In step 401b, the terminal device receives the downlink control information sent by the network device. Then, the terminal device demodulates the control information, to obtain the scheduling information of the downlink data.

Before the network device sends the downlink control information, the network device may further send information indicating the value of $N_1$. In addition, the reference signals of the $N_1$ antenna ports may be cell common reference signals. The value of a quantity $N_1$ of the cell common reference signals may be 1, 2, or 4. The value of $N_1$ is carried over a physical broadcast channel. For different $N_1$, the network device scrambles data of the physical broadcast channel by using different scrambling codes. The data of the physical broadcast channel can be correctly detected only when the data of the physical broadcast channel is descrambled by using a scrambling code corresponding to correct $N_1$. When the terminal device receives the physical broadcast channel, the terminal device descrambles the data of the physical broadcast channel by using three different scrambling codes respectively corresponding to $N_1=1$, 2, and 4. In this way, the value of $N_1$ may be obtained.

For example, the $N_1$ antenna ports are antenna ports for CRSs, and $N_1=2$. In addition, patterns (or pattern) of the CRS reference signals of the two antenna ports are specified in a protocol in advance, as shown in FIG. 1b. After reception, the terminal device learns from which the terminal device receives the CRSs of the two antenna ports.

Optionally, the network device sends a first message to the terminal device, where the first message is used to indicate resources of the reference signals of the $N_2$ antenna ports in frequency domain. The first message may be carried in the downlink control message. The first message indicates a frequency domain resource occupied by the downlink data.

For example, the second message indicates whether the downlink data occupies a first half of the system bandwidth in frequency domain. A control channel may be a physical downlink control channel (PDCCH). In addition, the downlink data and the reference signals of the $N_2$ antenna ports have a same range in frequency domain. For example, the network device sends the downlink data and the reference signals of the $N_2$ antenna ports on a same physical resource block pair. After receiving the first message, the terminal device determines the resources of the reference signals of the $N_2$ antenna ports in frequency domain based on the first message. The network device may flexibly designate, for the terminal device based on frequency domain locations allocated to the terminal device, frequency domain locations of the reference signals that are of the $N_2$ antenna ports and that are specific to the terminal device. Therefore, the reference signals of the $N_2$ antenna ports exist only on a bandwidth designated by the network device, thereby improving control flexibility of the network device. The first message may be sent before the network device sends the downlink data to the terminal device. The network device may send the first message and the downlink data at the same time. For example, the network device sends the first message and the downlink data in a same subframe.

Optionally, before the network device sends the downlink data to the terminal device, the network device may further receive CSI sent by the terminal device. For example, the CSI includes an RI, a PMI, and a CQI. After receiving the RI, the PMI, and the CQI that are sent by the terminal device, the network device determines a precoding matrix based on the RI and the PMI. The network device determines a modulation and coding scheme of to-be-sent downlink data based on the CQI. The network device determines the to-be-sent downlink data based on the modulation and coding scheme. Then, the network device precodes the to-be-sent downlink data by using the precoding matrix. Alternatively, the CSI may include the CQI, but not the RI or the PMI. The network device is accessed, and then sends the downlink data to the terminal device in a transmit diversity manner.

Optionally, the network device sends a second message to the terminal device, where the second message is used to indicate a value of $N_2$. The second message may be carried in the downlink control information sent by the network device to the terminal device. For details, refer to the process in which the network device sends the downlink control information in FIG. 4b. For example, $N_2=2$ indicates two antenna ports for reference signals specific to the terminal device. The second message may further include a field A indicating the quantity N of layers of the downlink data. The terminal obtains the value of $N_2$ based on the relationship $N=N_1+N_2$. For example, the second message includes a field indicating that the quantity N of layers of the downlink data is equal to 4. In addition, the terminal device obtains $N_1=2$ by using a physical broadcast channel. In this way, the terminal device obtains $N_2=2$ based on $N=N_1+N_2$. Based on the method, the field A in the second message indirectly indicates the value of $N_2$. After receiving the second message, the terminal device determines $N_2$ based on the second message. The network device may flexibly control, based on characteristics of the terminal device, such as a channel condition and a quantity of antenna ports that the terminal device is equipped with, resources occupied by the reference signals specific to the terminal device, thereby increasing resource utilization.

Optionally, the network device sends a precoding matrix indication PMI to the terminal device, where the PMI is used to indicate a precoding matrix. For example, the downlink control information in step 401a further includes the PMI. The terminal device receives the precoding matrix indication PMI from the network device, and the terminal device determines an indicated precoding matrix V based on the PMI. The terminal device may obtain an equivalent channel H×V based on channels H and V. The terminal device may demodulate the data based on the equivalent channel H×V and Y by using a conventional algorithm, for example, zero forcing (zero forcing). In addition to being carried in the downlink control message in step 401, the PMI may be carried in another message. The PMI may be sent before the network device sends the downlink data. The PMI may be carried in the downlink control information. Alternatively, the PMI and the downlink data may be sent in a same subframe. The network device may ensure that the reference signals of the $N_1$ antenna ports are shared by all terminal devices in a cell, so that the terminal device may obtain a performance gain generated through channel precoding, thereby improving performance of the terminal device, and increasing network resource utilization.

Optionally, the network device sends the reference signals of the N antenna ports and the downlink data in a first time unit. The first time unit may be a subframe, a slot, a symbol, or the like. The network device receives the reference signals of the N antenna ports and the downlink data in the first time unit. Then, the terminal device demodulates the downlink data based on the reference signals of the N antenna ports.

Step 402: The terminal device demodulates the data.

In step 402, the terminal device receives the reference signals of the N antenna ports and the downlink data from the network device, and then demodulates the downlink data based on the reference signals of the N antenna ports.

The terminal device demodulates the downlink data based on the reference signals of the N antenna ports. For example, the terminal device may determine time-frequency locations of the $N_2$ reference signals based on the first message and the second message that are delivered by the network device. After receiving the downlink data Y, the terminal device obtains the reference signals of the $N_1+N_2$ ports. The terminal device obtains an estimated channel H of the $N=N_1+N_2$ ports based on the reference signals of the $N_1+N_2$ ports.

If the downlink data is sent in a transmit diversity mode, the terminal device demodulates the data by using the estimated channel H and the downlink data Y. $N_1=1$ and $N_2=1$ are used as an example. At each subcarrier location, channels obtained through estimation based on the reference signals of the $N_1$ antenna ports are $h_{1,1}, \ldots,$ and $h_{N_R,1}$, and channels obtained through estimation based on the reference signals of the $N_2$ antenna ports are $h_{1,2}, \ldots,$ and $h_{N_R,2}$. $N_R$ is a quantity of ports of receive antennas of the terminal device. In this case, an estimated channel matrix obtained by the terminal device is $$H = \begin{bmatrix} h_{1,1} & h_{1,2} \\ h_{2,1} & h_{2,2} \\ \vdots & \vdots \\ h_{N_R,1} & h_{N_R,2} \end{bmatrix}.$$

For example, at an even-numbered subcarrier location, a data symbol received by the terminal device is $$Y(2m) = \begin{bmatrix} y^{(1)}(2m) \\ \vdots \\ y^{(N_R)}(2m) \end{bmatrix} = H_{2m} \times \begin{bmatrix} x_1(i) \\ -(x_2(i))^* \end{bmatrix} + n;$$

and at an odd-numbered subcarrier location, a data symbol received by the terminal device is $$Y(2m+1) = \begin{bmatrix} y^{(1)}(2m+1) \\ \vdots \\ y^{(N_R)}(2m+1) \end{bmatrix} = H_{2m+1} \times \begin{bmatrix} x_2(i) \\ (x_1(i))^* \end{bmatrix} + n,$$

where $x_1(i)$ represents a first data symbol in an $i^{th}$ group of data symbols sent by the network device (one group of data symbols includes two data symbols), and $x_2(i)$ represents a second data symbol in the $i^{th}$ group of data symbols sent by the network device; $H_{2m}$ represents a channel estimation result at an index location $2m$ of an even-numbered subcarrier, and $H_{2m+1}$ represents a channel estimation result at an index location $2m+1$ of an odd-numbered subcarrier; $Y(2m)$ and $Y(2m+1)$ respectively represent signals received at locations $2m$ and $2m+1$, and n represents noise.

Therefore, the terminal device demodulates data $$x_i = \begin{bmatrix} x_1(i) \\ x_2(i) \end{bmatrix}$$

based on $H_{2m}$, $H_{2m+1}$, and the received signals $Y(2m)$ and $Y(2m+1)$.

If the downlink data is sent in an open-loop MIMO multiplexing mode, the terminal device demodulates the data by using the estimated channel H and the downlink data Y.

For example, on an $m^{th}$ subcarrier, $$Y(m) = \begin{bmatrix} y^{(1)}(m) \\ \vdots \\ y^{(N_R)}(m) \end{bmatrix} = H_m \times W(i) \times D(i) \times U \times \begin{bmatrix} x_1(i) \\ x_2(i) \end{bmatrix},$$

where

W(i), D(i), and U are generated in a predefined manner; for details, refer to descriptions in LTE 36.211 Release 8 and later releases; Y(m) and $H_m$ respectively represent a signal received at a subcarrier m and a channel estimated at the subcarrier m.

In this way, the terminal device demodulates the data $$x_i = \begin{bmatrix} x_1(i) \\ x_2(i) \end{bmatrix}$$

based on W(i), D(i), and U that are generated according to a predefined rule, $H_m$, and the received data Y(m).

If the downlink data is sent in a closed-loop MIMO multiplexing mode, the terminal device further needs to receive the PMI, and determines the precoding matrix V based on the PMI. Then, the terminal device demodulates the data based on the estimated channel H and the precoding matrix V.

For example, on the $m^{th}$ subcarrier, the received signal Y(m) is $$Y(m) = \begin{bmatrix} y^{(1)}(m) \\ \vdots \\ y^{(N_R)}(m) \end{bmatrix} = H_m \times V \times \begin{bmatrix} x_1(i) \\ x_2(i) \end{bmatrix}.$$

In this way, the terminal device demodulates the data $$x_i = \begin{bmatrix} x_1(i) \\ x_2(i) \end{bmatrix}$$

based on $H_m$, V, and the received data Y(m). $H_m$ represents the channel estimated on the subcarrier m.

Therefore, in the reference signal sending method in this embodiment of the present invention, the network device sends the reference signals of the N antenna ports and the downlink data to the terminal device. The reference signals of the N antenna ports include the cell common reference signals of the $N_1$ antenna ports and the reference signals that are of the $N_2$ antenna ports and that are specific to the terminal device. After receiving the reference signals of the N antenna ports and the downlink data, the terminal device detects the downlink data based on the reference signals. Based on the solution of this application, reference signal overheads can be reduced, and resource utilization can be increased.

Figure 8:
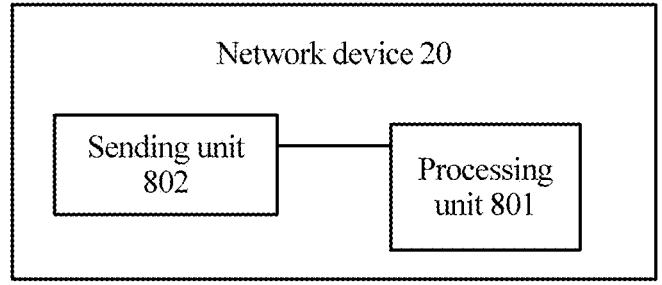
FIG. 8 is a schematic block diagram of a network device according to an embodiment of the present invention.

As shown in FIG. 8, an embodiment of the present invention provides a network device. The network device can be applied to the communications system shown in FIG. 3, to implement the method in the corresponding embodiment in FIG. 4a. The network device may be a network device 20, and includes a processing unit 801 and a sending unit 802.

The processing unit 801 is configured to generate reference signals that are of N antenna ports and that are used to demodulate downlink data.

The sending unit 802 is configured to send the reference signals of the N antenna ports and the downlink data to a terminal device.

The reference signals of the N antenna ports include cell common reference signals of $N_1$ antenna ports and reference signals that are of $N_2$ antenna ports and that are specific to the terminal device, N is an integer greater than or equal to 2, $N=N_1+N_2$, and $N_1$ and $N_2$ are positive integers.

Optionally, a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

Optionally, before sending the downlink data to the terminal device, the sending unit 802 is further configured to send a first message to the terminal device, where the first message is used to indicate resources of the reference signals of the $N_2$ antenna ports in frequency domain.

Optionally, the sending unit 802 is further configured to send a second message to the terminal device, where the second message is used to indicate a value of $N_2$.

Optionally, the sending unit 802 is further configured to send a precoding matrix indication PMI to the terminal device, where the PMI is used to indicate a precoding matrix.

Optionally, that the sending unit 802 sends the reference signals of the N antenna ports and the downlink data to a terminal device includes that the sending unit 802 sends the reference signals of the N antenna ports and the downlink data in a same subframe.

Therefore, the network device sending a reference signal in this embodiment of the present invention sends the reference signals of the N antenna ports and the downlink data to the terminal device. The reference signals of the N antenna ports include the cell common reference signals of the $N_1$ antenna ports and the reference signals that are of the $N_2$ antenna ports and that are specific to the terminal device. Based on the solution of this application, reference signal overheads can be reduced, and resource utilization can be increased.

Figure 9:
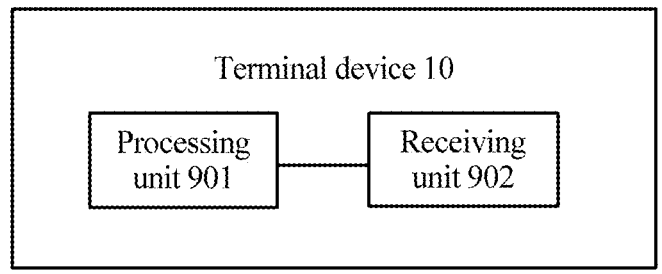
FIG. 9 is a schematic block diagram of a terminal device according to an embodiment of the present invention.

As shown in FIG. 9, an embodiment of the present invention provides a terminal device. The network device can be applied to the communications system shown in FIG. 3, to implement the method in the corresponding embodiment in FIG. 4a. The terminal device may be a terminal device 10 (10A or 10B), and includes a receiving unit 902 and a processing unit 901.

The receiving unit 902 is configured to receive reference signals of N antenna ports and downlink data from a network device.

The processing unit 901 is configured to demodulate the downlink data based on the reference signals of the N antenna ports.

The reference signals of the N antenna ports include cell common reference signals of $N_1$ antenna ports and reference signals that are of $N_2$ antenna ports and that are specific to the terminal device, N is an integer greater than or equal to 2, $N=N_1+N_2$, and $N_1$ and $N_2$ are positive integers.

Optionally, a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

Optionally, the receiving unit 902 is further configured to receive a first message from the network device, and the processor is further configured to determine resources of the reference signals of the $N_2$ antenna ports in frequency domain based on the first message.

Optionally, the terminal device further includes that the receiving unit 902 is further configured to receive a second message from the network device, and that the processing unit 901 is further configured to determine a value of $N_2$ based on the second message.

Optionally, the receiving unit 902 is further configured to receive a precoding matrix indication PMI from the network device, and the processing unit 901 is further configured to determine a precoding matrix based on the PMI. Also, that the processing unit 901 demodulates the downlink data based on the reference signals of the N antenna ports includes that the processing unit 901 demodulates the downlink data based on the reference signals of the N antenna ports and the precoding matrix.

Optionally, that the receiving unit 902 receives reference signals of N antenna ports and downlink data from a network device includes that the receiving unit 902 is further configured to receive the reference signals of the N antenna ports and the downlink data in a same subframe.

Therefore, the terminal device receiving a reference signal in this embodiment of the present invention receives the reference signals of the N antenna ports and the downlink data. The reference signals of the N antenna ports include the cell common reference signals of the $N_1$ antenna ports and the reference signals that are of the $N_2$ antenna ports and that are specific to the terminal device. After receiving the reference signals of the N antenna ports and the downlink data, the terminal device detects the downlink data based on the reference signals. Based on the solution of this application, reference signal overheads can be reduced, and resource utilization can be increased.

Figure 10:
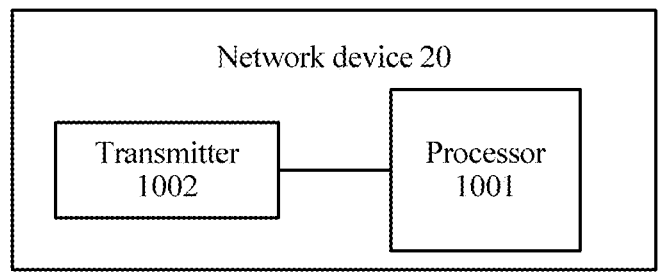
FIG. 10 is another schematic block diagram of a network according to an embodiment of the present invention.
Figure 11:
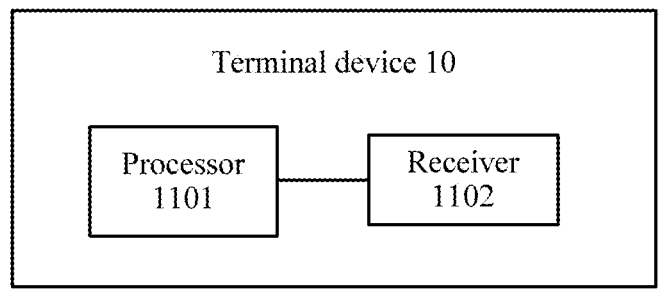
FIG. 11 is another schematic block diagram of a terminal device according to an embodiment of the present invention.

The network device 20 including a processor 1001 and a transmitter 1002 is shown in FIG. 10. The terminal device 10 including a processor 1001 and a receiver 1002 is shown in FIG. 11.

Figure 12:
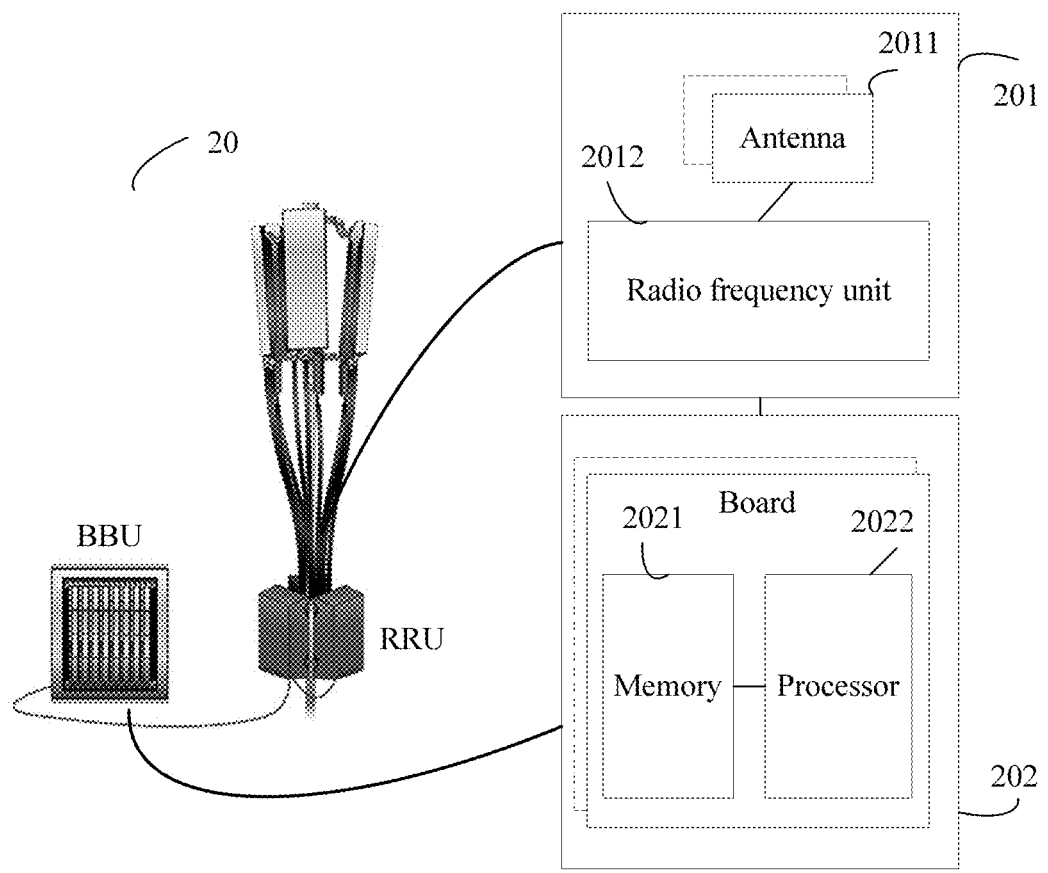
FIG. 12 is a schematic structural diagram of a network device according to an embodiment of the present invention.

FIG. 12 is a schematic structural diagram of a network device. The network device may be the network device 20 in FIG. 3, and the network device 20 may be a base station. The network device 20 includes one or more remote radio frequency units (or remote radio unit, RRU) 201 and one or more baseband units (BBU) 202. The RRUs 201 may be referred to as transceiver units, transceiver machines, transceiver circuits, transceivers, or the like, and may include at least one antenna 2011 and a radio frequency unit 2012. The RRUs 201 are mainly configured to: receive and send radio frequency signals and perform conversion between a radio frequency signal and a baseband signal, for example, configured to send the signaling indication and/or the reference signals in the foregoing embodiment to user equipment. The BBUs 202 are mainly configured to: process a baseband, control the network device, and the like. The RRUs 201 and the BBUs 202 may be physically disposed together or separately. That is, the network device 20 is a distributed network device.

The BBU 202 is a control center of the network device, and is mainly configured to complete baseband processing functions, such as reference signal generation, channel coding, multiplexing, modulation, and spectrum spreading. In an example, the BBU 202 may include one or more boards, and a plurality of boards may jointly support a radio access network (such as an LTE network or a 5G network) of a single access standard, or may respectively support radio access networks of different access standards. The BBU 202 further includes a memory 2021 and a processor 2022. The memory 2021 is configured to store a necessary instruction and necessary data. The processor 2022 is configured to control the network device to perform a necessary action, for example, configured to control the network device to send data and a reference signal. The memory 2021 and the processor 2022 may serve one or more boards. That is, a memory and a processor may be independently disposed on each board. Alternatively, a plurality of boards share a same memory and processor. In addition, a necessary circuit is further disposed on each board.

Figure 13:
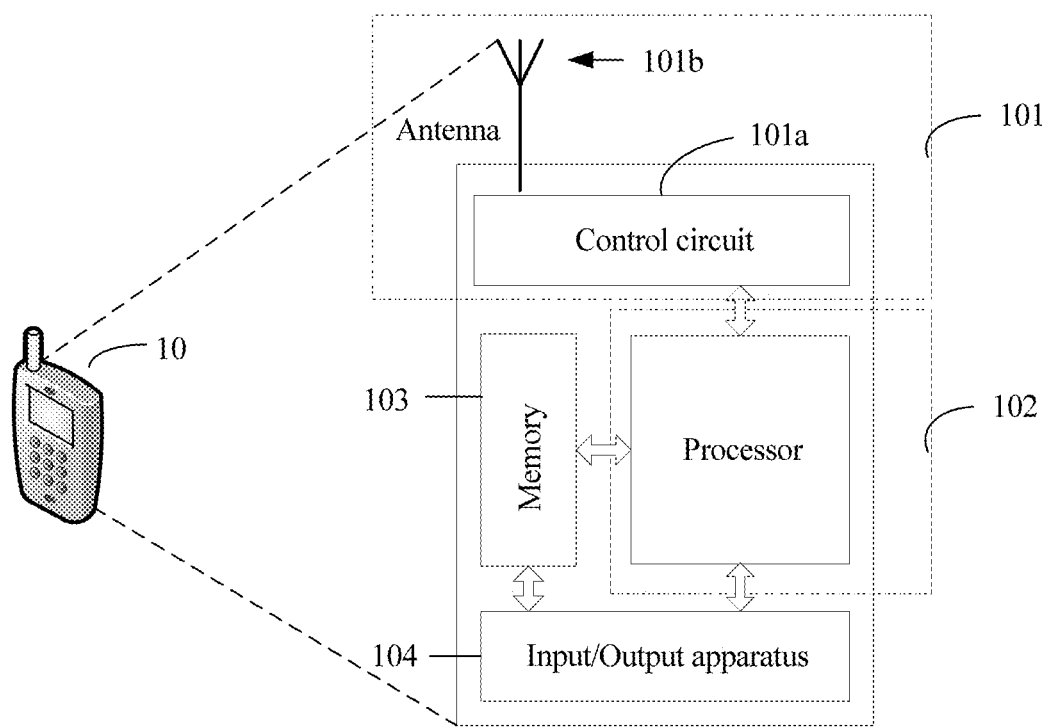
FIG. 13 is a schematic structural diagram of a terminal device according to an embodiment of the present invention.

FIG. 13 is a schematic structural diagram of a terminal device. The terminal device may be the terminal device 10 in FIG. 3. For ease of description, FIG. 13 shows only main components of the terminal device. As shown in FIG. 13, the user equipment 10 includes a processor 102, a memory 103, a control circuit 101a, an antenna 101b, and an input/output apparatus 104. The processor 102 is mainly configured to process a communications protocol and communication data, control the entire user equipment, execute a software program, and process data of the software program. The memory 102 is mainly configured to store the software program and the data. The control circuit 101a is mainly configured to: perform conversion between a baseband signal and a radio frequency signal and process the radio frequency signal. The control circuit 101a and the antenna 101b are jointly referred to as a transceiver, and are mainly configured to receive and send radio frequency signals in a form of electromagnetic waves. For example, the control circuit 101a and the antenna 101b may be configured to receive a signaling indication, a reference signal, and/or the like sent by a base station. For another example, the control circuit 101a and the antenna 101b may send a PMI to a base station. The input/output apparatus 104 may be a touchscreen, a display, a keyboard, or the like, and is mainly configured to: receive data input by a user and output data to the user.

After the terminal device is powered on, the processor 102 may read the software program in the storage unit, interpret and execute an instruction in the software program, and process the data of the software program. When data needs to be sent wirelessly, after performing baseband processing on the to-be-sent data, the processor 102 outputs a baseband signal to a radio frequency circuit. After performing radio frequency processing on the baseband signal, the radio frequency circuit sends the radio frequency signal to the outside by using the antenna in a form of an electromagnetic wave. When data is sent to the user equipment, the radio frequency circuit receives a radio frequency signal by using the antenna, converts the radio frequency signal into a baseband signal, and outputs the baseband signal to the processor. The processor 102 converts the baseband signal into data and processes the data.

A person skilled in the art may understand that FIG. 13 shows only one memory and processor for ease of description. Actual user equipment may include a plurality of processors and memories. A memory may also be referred to as a storage medium, a storage device, or the like. This is not limited in this embodiment of the present invention.

In an optional implementation, the processor may include a baseband processor and a central processing unit, the baseband processor is mainly configured to process the communications protocol and the communication data, and the central processing unit is mainly configured to control the entire user equipment, execute the software program, and process data of the software program. The processor in FIG. 13 integrates functions of the baseband processor and the central processing unit. A person skilled in the art may understand that the baseband processor and the central processing unit may also be processors independent of each other, and may be connected to each other by using a bus and another technology. A person skilled in the art may understand that the user equipment may include a plurality of baseband processors, to adapt to different network standards. The user equipment may include a plurality of central processing units, to enhance a processing capability of the user equipment. Components of the user equipment may be connected by using various buses. The baseband processor may also be described as a baseband processing circuit or a baseband processing chip. The central processing unit may also be expressed as a central processing circuit or a central processing chip. A function of processing the communications protocol and the communication data may be embedded in the processor, or may be stored in the storage unit in a form of a software program. The processor executes the software program to implement the baseband processing function.

The processing unit 801 may be specifically the processor 1001, and the processing unit 901 may be specifically the processor 1101. The sending unit 802 may be the transmitter 1002. The receiving unit 902 may be the receiver 1102.

The processing unit 801 may also be specifically the BBU and the processor 2022 in FIG. 12. The sending unit 802 may be the radio frequency unit 2012 and the antenna 2011. The receiving unit 902 may be 101 in FIG. 13, and includes the control circuit and the antenna.

The illustrative logical blocks and steps that are listed in the embodiments of the present invention may be implemented by using electronic hardware, computer software, or a combination thereof. Whether such functions are performed by hardware or software depends on particular applications and design constraints of an entire system. A person skilled in the art may use various methods to implement the described functions for each particular application, but it should not be considered that the implementation goes beyond the protection scope of the embodiments of the present invention.

The illustrative logical units and circuits described in the embodiments of the present invention may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may also be any conventional processor, a controller, a microcontroller, or a state machine. Alternatively, the processor may be implemented by using a combination of computing apparatuses, such as the digital signal processor and the microprocessor, a plurality of microprocessors, one or more microprocessors in combination with a digital signal processor core, or any other similar configuration.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (for example, a DVD), a semiconductor medium (for example, a solid-state drive Solid State Disk (SSD)), or the like.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed:

1. A method comprising:
generating, by a network device, reference signals that are of N antenna ports and that are used to demodulate downlink data; and
sending, by the network device, the reference signals of the N antenna ports and the downlink data to a terminal device, wherein the reference signals of the N antenna ports comprise cell common reference signals of $N_1$ antenna ports, and reference signals that are of $N_2$ antenna ports and that are specific to the terminal device and determined according to characteristics of each terminal device including at least a channel condition and a quantity of antenna ports that the terminal device is equipped with, and wherein N is an integer greater than or equal to 2, $N=N_1+N_2$, and $N_1$ and $N_2$ are positive integers.

2. The method according to claim 1, wherein a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

3. The method according to claim 1, further comprising:
sending, by the network device, a first message to the terminal device, wherein the first message is used to indicate resources of the reference signals of the $N_2$ antenna ports in frequency domain.

4. The method according to claim 3, further comprising:
sending, by the network device, a second message to the terminal device, wherein the second message is used to indicate a value of $N_2$.

5. The method according to claim 1, further comprising:
sending, by the network device, a second message to the terminal device, wherein the second message is used to indicate a value of $N_2$.

6. The method according to claim 1, further comprising:
sending, by the network device, a precoding matrix indication PMI to the terminal device, wherein the PMI is used to indicate a precoding matrix.

7. The method according to claim 1, wherein the reference signals of the N antenna ports and the downlink data are sent in a same subframe.

8. A method comprising:
receiving, by a terminal device, reference signals of N antenna ports and downlink data from a network device; and
demodulating, by the terminal device, the downlink data based on the reference signals of the N antenna ports, wherein the reference signals of the N antenna ports comprise cell common reference signals of $N_1$ antenna ports and reference signals that are of $N_2$ antenna ports and that are specific to the terminal device and determined according to characteristics of each terminal device including at least a channel condition and a quantity of antenna ports that the terminal device is equipped with, and wherein N is an integer greater than or equal to 2, $N=N_1+N_2$, and $N_1$ and $N_2$ are positive integers.

9. The method according to claim 8, wherein a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

10. The method according to claim 8, further comprising:
receiving, by the terminal device, a first message from the network device; and
determining, by the terminal device, resources of the reference signals of the $N_2$ antenna ports in frequency domain based on the first message.

11. The method according to claim 10, further comprising:
receiving, by the terminal device, a second message from the network device; and
determining, by the terminal device, a value of $N_2$ based on the second message.

12. The method according to claim 8, further comprising:
receiving, by the terminal device, a second message from the network device; and
determining, by the terminal device, a value of $N_2$ based on the second message.

13. The method according to claim 8, further comprising:
receiving, by the terminal device, a precoding matrix indication PMI from the network device; and
determining, by the terminal device, a precoding matrix based on the PMI, wherein demodulating the downlink data based on the reference signals of the N antenna ports comprises:
demodulating, by the terminal device, the downlink data based on the reference signals of the N antenna ports and the precoding matrix indication.

14. The method according to claim 8, wherein the reference signals of the N antenna ports and the downlink data are received in a same subframe.

15. A network device, comprising:
a processor; and
a computer-readable storage medium storing a program to be executed by the processor, the program including instructions for:
generating reference signals that are of N antenna ports and that are used to demodulate downlink data; and
a sending unit, configured to send the reference signals of the N antenna ports and the downlink data to a terminal device, wherein the reference signals of the N antenna ports comprise cell common reference signals of $N_1$ antenna ports, and reference signals that are of $N_2$ antenna ports and that are specific to the terminal device and determined according to characteristics of each terminal device including at least a channel condition and a quantity of antenna ports that the terminal device is equipped with, and wherein N is an integer greater than or equal to 2, $N=N_1+N_2$, and $N_1$ and $N_2$ are positive integers.

16. The network device according to claim 15, wherein a bandwidth occupied in frequency domain by a cell common reference signal of each of the $N_1$ antenna ports is a system bandwidth, and a bandwidth occupied in frequency domain by a reference signal that is of each of the $N_2$ antenna ports and that is specific to the terminal device is a portion of the system bandwidth.

17. The network device according to claim 15, wherein before sending the downlink data to the terminal device, the sending unit is further configured to send a first message to the terminal device, wherein the first message is used to indicate resources of the reference signals of the $N_2$ antenna ports in frequency domain.

18. The network device according to claim 15, wherein the sending unit is further configured to send a second message to the terminal device, wherein the second message is used to indicate a value of $N_2$.

19. The network device according to claim 15, wherein the sending unit is further configured to send a precoding matrix indication (PMI) to the terminal device, wherein the PMI is used to indicate a precoding matrix.

20. The network device according to claim 15, wherein the sending unit sends the reference signals of the N antenna ports and the downlink data in a same subframe.

* * * * *